(12) United States Patent
Al-Smail

(10) Patent No.: US 12,100,878 B2
(45) Date of Patent: *Sep. 24, 2024

(54) FUEL CELL ASSEMBLY WITH CARBON DIFFUSION LAYER

(71) Applicant: KING FAHD UNIVERSITY OF PETROLEUM AND MINERALS, Dhahran (SA)

(72) Inventor: Jamal Hussain Al-Smail, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,862

(22) Filed: Mar. 18, 2024

(65) Prior Publication Data

US 2024/0234776 A1 Jul. 11, 2024

Related U.S. Application Data

(60) Continuation of application No. 18/310,559, filed on May 2, 2023, now Pat. No. 11,978,936, which is a division of application No. 16/588,166, filed on Sep. 30, 2019, now Pat. No. 11,658,323.

(51) Int. Cl.
    *H01M 8/1067* (2016.01)
    *H01M 4/86* (2006.01)
    *H01M 8/04119* (2016.01)

(52) U.S. Cl.
    CPC ......... *H01M 8/1067* (2013.01); *H01M 4/861* (2013.01); *H01M 8/04149* (2013.01)

(58) Field of Classification Search
    CPC .......... H01M 8/04–04992; H01M 8/10–1093; H01M 4/86–98
    See application file for complete search history.

(56) References Cited

U.S. PATENT DOCUMENTS

| | | | |
|---|---|---|---|
| 7,374,838 B2 | 5/2008 | Gallagher | |
| 8,523,964 B2 | 9/2013 | Yamamoto et al. | |
| 9,147,890 B2 | 9/2015 | Shirvanian | |
| 11,658,323 B2* | 5/2023 | Al-Smail | H01M 4/861 |
| | | | 429/534 |
| 11,978,936 B2* | 5/2024 | Al-Smail | H01M 8/023 |
| 11,984,630 B2* | 5/2024 | Al-Smail | H01M 4/861 |

(Continued)

FOREIGN PATENT DOCUMENTS

| | | |
|---|---|---|
| CN | 1180250 A | 4/1998 |
| CN | 105335600 B | 4/2018 |

(Continued)

OTHER PUBLICATIONS

Lee et al., "Effect of Porosity Gradient in Gas Diffusion Layer on Cell Performance with Thin-Film Agglomerate Model in Cathode Catalyst Layer of a PEM Fuel Cell," The American Society of Mechanical Engineering, pp. 895-901, Abstract Only, (2011).

(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

A method for making an improved fuel cell using a porosity gradient design for gas diffusion layers in a hydrogen fuel cell, a gas diffusion layer made by the method and a fuel cell containing the gas diffusion layer.

6 Claims, 14 Drawing Sheets

(56) References Cited

U.S. PATENT DOCUMENTS

2005/0112449 A1* 5/2005 Mathias .............. H01M 8/0234
429/480
2006/0228622 A1 10/2006 Cohen
2009/0297919 A1 12/2009 Peng et al.

FOREIGN PATENT DOCUMENTS

| JP | 5253865 B2 | 7/2013 |
|----|------------|--------|
| WO | 03/073546 A1 | 9/2003 |
| WO | 2013/088122 A1 | 6/2013 |

OTHER PUBLICATIONS

Roshandel et al., "The Effects of Porosity Distribution Variation on PEM Fuel Cell Performance," Renewable Energy, vol. 30, Issue 10, pp. 1557-1572, Abstract Only, (Aug. 2005).

Roshandel et al., "Numerical Simulation of Non-Uniform Gas Diffusion Layer Porosity Effect on Polymer Electrolyte Membrane Fuel Cell Performance," IJE Transactions B: Application, vol. 20, No. 2, pp. 179-192 (Aug. 2007).

Chu et al., "Effects of Porosity Change of Gas Diffuser on Performance of Proton Exchange Membrane Fuel Cell," Journal of Power Sources, vol. 123, Issue 1, pp. 1-9, Abstract Only, (Sep. 15, 2003).

Al-Smail, "Uniform Reaction Rates and Optimal Porosity Design for Hydrogen Fuel Cells," (2015).

Gao et al., "Simulate Fluid Transport in Gas Diffusion Layers of PEM Fuel Cells Using Lattice Boltzmann Method and X-Ray Computed Tomography," University of Liverpool, (Dec. 2012).

Carnevali, "Modelling and Control of PEM Fuel Cells," Universitat Politencia De Catalunya I. (Jun. 2017).

Al-Smail, "Optimal Porosity Design for Gas Diffusion Layers of Hydrogen Fuel Cells," Proceedings of the Conference on Summer Computer Simulation, SummerSim, (2015).

* cited by examiner

FIG. 11-1

Comsol Script Code:

clear all;

% COMSOL version: COMSOL 3.3

```
nsteps=100;

l=0.2; h_G=3e-3; por_i=0.75; c_avg_factor=1.1;

Hm=3e-3; c_in=0.24; c_out=0.1; p_ch=1.00e5;
    c_av=(c_in+c_out)/2;c_ratio=c_out/c_in;

p_in=2.02e5; p_out=c_ratio*p_in*0+p_ch;

delta=0.01; Lam=100; delta_Lam=5;
        lambda=1/Lam;

por_min=0.1; por_max=0.8;
        E_tol=1e-3;
        hG=num2str(h_G); lG=num2str(l);
%%%%%%%%%%%%%%%%%%%%%%%%%%%%%%%%%%%%%%%%%%%%%%%%%%%
%%%%%
j=0:delta:1;
xj=l*[0:delta:1]; por=por_i*ones(1,1/delta+1); POR(1,:)=por;
% Initial porosity assembly
xj_s=cell(1,1/delta+1);
por_s=cell(1,1/delta+1);
for i=1:nsteps
%%%%%%%%%%%%%%%%%%%%%%%%%%%%%%%%%%%%%%%%%%%%%%%%%%%
%%%%%
  for k=1:1/delta+1
    xj_s{k}=num2str(xj(k));
    por_s{k}=num2str(por(k));
  end % Geometry
g1=rect2(lG,hG,'base','corner','pos',{'0','0'},'rot','0');
% Analyzed geometry
clear s
s.objs={g1};
s.name={'R1'};
s.tags={'g1'};
fem.draw=struct('s',s);
fem.geom=geomcsg(fem);
```

FIG. 11-2

```
% Constants
fem.const = {'D_o','3.7e-5', ...
  'mu','2.07e-5', ...
  'K','1.25e-12', ...
  'por_i',por_i, ...
  'M_o','32e-3', ...
  'M_n','28e-3', ...
  'M_w','18e-3', ...
  'R','8.314', ...
  'T','348', ...
  'Fa','96485', ...
  'c_avg_factor',c_avg_factor,...
  'H_m',Hm, ...
  'rg','b_m*H_m', ...
  'b_o','M_w/M_o-1', ...
  'b_n','M_w/M_n-1', ...
  'alpha_w','0.3', ...
  't',1, ...
  'p_in',p_in, ...
  'p_out',p_out, ...
  'dp','p_out-p_in', ...
  'c_n','0.68', ...
  'c_in',c_in, ...
  'c_out',c_out, ...
  'dc','c_out-c_in', ...
  'd_por','1e-5', ...
  'b_m','2*M_w/M_o*(1+2*alpha_w)-1', ...
  't_a','0', ...
  'a','1', ...
  'b','0', ...
  't_s','0','d_por',1e-5};
% Initialize mesh
fem.mesh=meshinit(fem,'hmarrow',15,'yscale',20,'xscale',1,'hmaxedg',[2,1e-3],'hmaxedg',[3,1e-3]);
% Application mode 1
clear appl
appl.mode.class = 'FlPDEW';
appl.dim = {'c','c_t'};
appl.name = 'advec_diff_o2';
appl.assignsuffix = '_advec_diff_o2';
clear bnd
%bnd.constrf = {0,'test(c-c_sig)',0};
bnd.constrtype = {'ideal','ideal','non-ideal'};
bnd.constr = {0,'c-por(x)*c_sig',0};
bnd.weak = {0,0,'H_m*c*test(c)'};
bnd.ind = [1,2,3,1];    % bn M is 3, and Interface is 2
```

FIG. 11-3

```
appl.bnd = bnd;
clear equ
equ.dweak = 0;
equ.weak = 'D_por*cx*test(cx)+D_por*cy*test(cy)-c*u_1*test(cx)-c*u_2*test(cy)';
equ.ind = [1];
appl.equ = equ;
fem.appl{1} = appl;

% Application mode 2
clear appl
appl.mode.class = 'FlPDEW';
appl.dim = {'p','p_t'};
appl.name = 'Reduced_Darcy';
appl.assignsuffix = '_Reduced_Darcy';
clear prop
clear weakconstr
weakconstr.value = 'off';
weakconstr.dim = {'lm3','lm4'};
prop.weakconstr = weakconstr;
appl.prop = prop;
clear pnt
pnt.weak = {0,1e-4};
pnt.ind = [1,1,1,2];   % bn M is 3, and Interface is 2
appl.pnt = pnt;
clear bnd
bnd.constrf = {0,'test(p-p_sig)',0};
bnd.constrtype = {'ideal','ideal','non-ideal'};
bnd.constr = {0,'p-p_sig',0};
bnd.weak = {0,0,'-b_m*H_m*c*test(p)'};
bnd.ind = [1,2,3,1];
appl.bnd = bnd;
clear equ
equ.dweak = 0;
equ.weak = 'K_por/mu*(px*test(px)+py*test(py))';
equ.ind = [1];
appl.equ = equ;
fem.appl{2} = appl;

% Application mode 3
clear appl
appl.mode.class = 'FlPDEW';
appl.dim = {'pa','pa_t'};
appl.name = 'Darcy_adjoint';
appl.assignsuffix = '_Darcy_adjoint';
clear prop
clear weakconstr
```

FIG. 11-4

```
weakconstr.value = 'off';
weakconstr.dim = {'lm5','lm6'};
prop.weakconstr = weakconstr;
appl.prop = prop;
clear bnd
%bnd.constrf = {0,'test(pa)'};
bnd.constr = {0,'pa'};           % pa=0 on Sig; flux=0 on other boundaries
bnd.ind = [1,2,1,1];
appl.bnd = bnd;
clear equ
equ.dweak = 0;
equ.weak = 'K_por/mu*(pax+c*cax)*test(pax)+K_por/mu*(pay+c*cay)*test(pay)';
equ.ind = [1];
appl.equ = equ;
fem.appl{3} = appl;

% Application mode 4
clear appl
appl.mode.class = 'FlPDEW';
appl.dim = {'ca','ca_t'};
appl.name = 'Adec_diff_adj';
appl.assignsuffix = '_Adec_diff_adj';
clear prop
clear weakconstr
weakconstr.value = 'off';
weakconstr.dim = {'lm7','lm8'};
prop.weakconstr = weakconstr;
appl.prop = prop;
clear bnd
%bnd.constrf = {0,'test(ca)',0};
bnd.constr = {0,'ca',0};
bnd.weak = {0,0,'(H_m*ca-rg*pa+g)*test(ca)'};
bnd.ind = [1,2,3,2];
appl.bnd = bnd;
clear equ
equ.dweak = 0;
equ.weak = 'D_por*(cax*test(cax)+cay*test(cay))+K_por/mu*(px*cax+py*cay)*test(ca)';
equ.ind = [1];
appl.equ = equ;
fem.appl{4} = appl;
fem.frame = {'ref'};
fem.border = 1;
clear units;
units.basesystem = 'SI';
fem.units = units;
```

FIG. 11-5

```
% Subdomain settings
clear equ
equ.ind = [1];
equ.dim = {'c','p','pa','ca'};

% Subdomain expressions
equ.expr = {'u_1','-K_por*px/mu', ...
        'u_2','-K_por*py/mu',...
        'D_por','por(x)^1.5*D_o',...
        'K_por','d_por^2/180*por(x)^3/(1-por(x)^2)'};
fem.equ = equ;

% Boundary settings
clear bnd
bnd.ind = [1,2,3,1];

% Boundary expressions
bnd.expr = {'p_sig',{'','dp*(x-l)/l+p_out',''}, ...
        'por_c_ratio',{'','por/c_sig',''}, ...
    'c_sig',{'','dc*(x-l)/l+c_out',''}, ...
    'g',{'','','a*(c-c_avg_factor*c_avg)-b*c'}, ...
    'dE1',{'','','dK/mu*(px*pax+py*pay+c*(px*cax+py*cay))'}, ...
    'dE2',{'','','dD*(cx*cax+cy*cay)'}, ...
    'dE',{'','','dE1+dE2'}, ...
    'dK',{'','','d_por^2/180*por(x)^2*(3-por(x)^2)/(1-por(x)^2)^2'}, ...
    'dD',{'','','1.5*D_o*por(x)^0.5'}};
fem.bnd = bnd;

% Scalar expressions
fem.expr = {'E','0.5*a*c_var-0.5*b*c_tot',...
        'stability','(1-sqrt(c_var/(M*c_avg^2)))*100',...
        'electricity_adv','c_avg'};

% Coupling variable elements
clear elemcpl
% Integration coupling variables
clear elem
elem.elem = 'elcplscalar';
elem.g = {'1'};
src = cell(1,1);
clear bnd
bnd.expr = {{{},'c/M'},{{},'1'},{{},'(c-c_avg)^2'},{{},'c^2'}};
bnd.ipoints = {{{},'4'},{{},'4'},{{},'4'},{{},'4'}};
bnd.frame = {{{},'ref'},{{},'ref'},{{},'ref'},{{},'ref'}};
bnd.ind = {{'1','2','4'},{'3'}};
src{1} = {{},bnd,{}};
```

FIG. 11-6

```
elem.src = src;
geomdim = cell(1,1);
geomdim{1} = {};
elem.geomdim = geomdim;
elem.var = {'c_avg','M','c_var','c_tot'};
elem.global = {'1','2','3','4'};
elem.maxvars = {};
elemcpl{1} = elem;
fem.elemcpl = elemcpl;

% Functions
clear fcns
fcns{1}.type='interp';
fcns{1}.name='por';
fcns{1}.method='cubic';
fcns{1}.extmethod='extrap';
fcns{1}.x=xj_s;
fcns{1}.data=por_s;
fem.functions = fcns;

% Multiphysics
fem=multiphysics(fem);

% Extend mesh
fem.xmesh=meshextend(fem);

% Solver script
fem1.xmesh=fem.xmesh;

fem.sol=femstatic(fem, ...
        'u',0, ...
        'solcomp',{'ca','pa','c','p'}, ...
        'outcomp',{'ca','c','pa','p'});
fem0=fem;

% Plot solution figure(1);postcrossplot(fem,1,[3],'lindata','c','grid','off',...
        'lincolor','k',...
        'linewidth',2,...
        'linstyle',{'-'},...
        'markersize',14,...
        'linlegend',{'off'},'title','Surface: c on M');
hold('on');

```
clc;

stability(i)=postinterp(fem,'stability',0.5,'edim',1,'dom',3);

por=postinterp(fem,'por(x)',j,'edim',1,'dom',3);
c_M(i,:)=postinterp(fem,'c',j,'edim',1,'dom',3);

electricity_adv(i)= postinterp(fem,'electricity_adv',0.5,'edim',1,'dom',3);
Stab_Cavg=[stability; electricity_adv]' vE(i)=postinterp(fem,'E',0.5,'edim',1,'dom',3);

dE=postinterp(fem,'dE',j,'edim',1,'dom',3);

porj_U=(por>=por_max);
porj_L=(por<=por_min);
porj_LU=(por<por_max-1e-4 & por>por_min+1e-4);

dE_U_ntve=(-dE.*porj_U)<0;
 dE_L_ptve=(-dE.*porj_L)>0;

dE_max(i)=max(abs([dE.*dE_U_ntve dE.*dE_L_ptve dE.*porj_LU]));
%%%%%%%%%%%%%%%%%%%%%%%%%%%%%%%%%%%%%%
if i==1 E_min=vE(1); end
%%%%%%%%%%%%%%%%%%%%%%%%%%%%%%%%%%%%%%
if i==nsteps
break
end if dE_max(i)==0
  break
end if vE(i)<=E_min % Store this porosity
     E_min=vE(i); iter_min=i
     por_opt=por;
     dE_max_opt=dE_max(i);

por=por-lambda*dE/dE_max(i);

por_U=min(por,por_max);
por=max(por_U,por_min); %Adjusting the porosity values within the range [por_min, por_max]

else    % Decrease the perturbation using the old assembled geometry.
    Lam=Lam+delta_Lam;
```

FIG. 11-8

```
        lambda=1/Lam; por=por_opt;
end
POR(i+1,:)=por;
figure(1);plot(xj,POR(i,:));
hold('on');
end
```

FUEL CELL ASSEMBLY WITH CARBON DIFFUSION LAYER

CROSS-REFERENCE TO RELATED APPLICATIONS

The present application is a Continuation of U.S. application Ser. No. 18/310,559, now allowed, having a filing date of May 2, 2023, which is a Division of U.S. application Ser. No. 16/588,166, now U.S. Pat. No. 11,658,323, having a filing date of Sep. 30, 2019.

ACKNOWLEDGEMENT

The inventors thank King Fahd University of Petroleum and Minerals for support under NSTIP Project #15-ENE5317-04.

STATEMENT REGARDING PRIOR DISCLOSURES BY INVENTORS

Some aspects of this technology were disclosed by Jamal H. Al-Smail in Optimal porosity design for gas diffusion layers of hydrogen fuel cells, *Proceedings of the Conference on Summer Computer Simulation*, SummerSim 2015, Chicago, IL, USA, Jul. 26-29, 2015. ACM 2015, ISBN 978-1-5108-1059-4, incorporated herein by reference in its entirety.

BACKGROUND OF THE INVENTION

Field of the Invention

The invention relates to the fields of chemistry, materials science, and energy production, more specifically to gas diffusion layers for hydrogen fuel cells.

Description of Related Art

Mathematical models have proven useful in designing better fuel cells especially when the models are included in a so-called optimal design methodology. These models strive to provide a fuel cell design that maximizes current density with respect to either the dimensions of the cell's components or to its operating conditions.

In some models, the current density or the reaction rate is maximized with respect to the composition of the catalyst layer; see D. Song, Q. Wang, Z. Liu, T. Navessin, M. Eikerling, and S. Holdcroft. Numerical optimization study of the catalyst layer of PEM fuel cell cathode. *Journal of Power Sources*, 126((1-2): 104-111, 2004].

In other models the current density is maximized with respect to operating conditions; see A. Mawardi, F. Yang, and R. Pitchumani. Optimization of the operating parameters of a proton exchange membrane feul cell for maximum power density. *The Journal of Fuel Cell Science and Technology*, 2(2): 121-135, 2005.

In some other models, the current density is also maximized with respect to the dimensions of the anode components; see M. Secanel, B. Carnes, A. Suleman, and N. Djilali. Numerical optimization of proton exchange membrane fuel cell cathode. *Electrochimica Acta*, 52(7): 2668-2682, 2007, for cathode components in M. Secanel, K. Karan, A. Suleman, and N. Djilali. Optimal design of ultra-low platinum PEMFC anode electrodes. *Journal of the Electrochemical Society*, 155(2): B125-B134, 2008; M. Secanel, R. Songprakorp, N. Djilali, and A. Suleman. Optimization of a proton exchange membrane fuel cell membrane electrode assembly. *Structural and Multidisciplinary Optimization*, 40:563-583, 2010, and with respect to the cathode CL in Dilger, C. Lizandara-Pueyo, M. Krumm and S. Polarz, Hierarchical Zinc Oxide Materials with Multiple Porosity Prepared by Ultrafast Temperature Gradient Chemical Gas-Phase Synthesis. *Advanced Materials*, 24, 543 (2011).

In addition, the effects of maximizing the current density with respect to both the cathode dimensions and the inlet pressure have been investigated; see M. Grujicic and K. Chittajallu. Optimization of the cathode geometry in the polymer electrolyte membrane (PEM) fuel cells. *Chemical Engineering Science*, 59:5883-5895, 2004.

Other work has investigated maximizing the current density with respect to some test geometries of the air channel; A. Kumar and R. G. Reddy. Effect of channel dimensions and shape in the flow-field distributor on the performance of polymer electrolyte membrane fuel cells. *Journal of Power Sources*, 113:11-18, 2003. Test geometries included rectangular, triangular and hemispherical air channels.

While maximizing the current density has been widely studied, providing a uniform current density has not be adequately investigated, though it was found that current distribution could be made more even by a platinum loading on the cathode catalyst part of a fuel cell. Moreover, past GDL models have kept its porosity constant; Jamal H. Al-Smail, Optimal porosity design for gas diffusion layers of hydrogen fuel cells, Proceedings of the Conference on Summer Computer Simulation, SummerSim 2015, Chicago, IL, USA, Jul. 26-29, 2015. ACM 2015, ISBN 978-1-5108-1059-4. However, GDL designs having a uniform porosity can generate hotspots and non-uniformly accumulate water (a reaction product of the hydrogen fuel and oxygen), in fuel cells where oxygen flows over a GDL as shown by FIG. 1. In such fuel cells, the oxygen concentration on the part of the GDL near the oxygen inflow (top, "air in" in FIG. 1) is higher than that at the outflow (bottom, "Unused gases out", FIG. 1), due to oxygen consumption and cumulative decrease of the oxygen concentration over the length of the GDL. Moreover, past designs having a variable GDL porosity suffered from reductions in reactant flux resulting in non-uniform current distribution.

In view of the need for improvements in fuel cell efficiency, stability and economy, the present disclosure provides a method that forms a GDL having non-uniform porosity. This method shows that fuel cell efficiency can be improved by providing a GDL with non-uniform porosity that evenly distributes oxygen to the catalyst layer thus reducing local hotspots and water accumulation both of which reduce fuel cell efficiency and stability.

BRIEF SUMMARY OF THE INVENTION

In a fuel cell containing a gas diffusion layer ("GDL") having a uniform porosity oxygen pressure declines along the X-axis which results in a non-uniform oxidation rate and decreased efficiency of a fuel cell containing the GDL. Thus reaction rates between oxygen and fuel differ along the x axis as there is less oxygen available for downstream pores. The method and corresponding GDL of the present disclosure compensate for this decline because by providing a GDL having porosity along the x axis that is adjusted such that the fuel cell has a uniform reaction rate between oxygen and fuel over the length of the GDL. More specifically, in distinction to prior methods and GDL-containing fuel cells, the present disclosure uses a boundary condition during formation of the GDL to take into account the impact of an air channel/GDL interface porosity cost function so that oxygen is evenly distributed on the catalytic membrane. In one embodiment the method produces a GDL having an increasing porosity along its X-axis and a uniform porosity along its Y axis, where oxygen flows along the X-axis. GDLs made with this method uniformly distribute oxygen over the GDL so as to maximize oxidation of hydrogen fuel in the fuel cell, while reducing or eliminating local hotspots and local accumulations of water, a by-product of oxidation of hydrogen. These features increase fuel cell efficiency, stability, durability and lifetime, and reduce the costs of generating electricity from the fuel cell.

One embodiment of the invention is directed to a method for producing a gas diffusion layer ("GDL") for a fuel cell which comprises a GDL having a length (x-axis) and height (y-axis) adjacent to a channel which has an inlet and an outlet through which oxygen flows;

said method including:
determining the oxygen mass fraction along the length or x-axis of the GDL using boundary condition (6):

$$p_g = p_{in} + \frac{p_{out} - p_{in}}{\ell} x, \quad (6)$$

$$c_o = \varepsilon(x)\left(c_{in} + \frac{c_{out} - c_{in}}{\ell} x\right),$$

where $p_g$ is gas density, $p_{in}$ is inlet pressure, $p_{out}$ is outlet pressure, $\ell$ is length of the GLD, and x is a space variable;

where $c_o$ is oxygen mass fraction, $\varepsilon$ is porosity of the gas diffusion layer, x is a space variable, $c_{in}$ is inlet oxygen mass fraction, and $c_{out}$ is outlet oxygen mass fraction, $\ell$ is length of the gas diffusion layer, and x is a space variable;

wherein the porosity of the GDL along its length $\varepsilon = \varepsilon(x)$ is represented by the minimizing cost functional E:

$$E(\varepsilon, c_o) := \frac{1}{2} a \int_M \left(c_o - \frac{1}{|M|} \int_M c_o\right)^2 - b \int_M c_o^2, \quad (7)$$

wherein $c_o$ is obtained from solution of boundary condition (6), and a and b are chosen non-dimensional scalars and M is the catalyst layer, inserting the gas diffusion layer having non-uniform porosity along its length or x-axis based on boundary condition (6) and minimization of cost functional (7) in a fuel cell. In (7) a and b determine preference factors toward uniform distribution of oxygen (by factor a) or maximizing oxygen for reaction (by factor b).

In some embodiments, the method may further include determining the values below:
$E(\varepsilon_*; U_*) = \min E(\varepsilon; U)$, subject to $A(\varepsilon; U) = 0$; wherein said solution is a minimizer of Lagrangian L, defined as $(\varepsilon, W, \Lambda) := E(\varepsilon; W) + \Lambda A(\varepsilon; W)$; and In other embodiments, this method may further include identifying a local minimizer $(\varepsilon^*, U^*, \Lambda^*)$ of the Lagrangian L that satisfies $L(\varepsilon^*, U^*, \Lambda^*) = 0$; comprising:

solving constraint equation:

$$\partial_\varepsilon L(\varepsilon_*, U_*, \Lambda_*) = \partial_\varepsilon E^\square(\varepsilon_*; U_*) + \Lambda_* \partial_\varepsilon A(\varepsilon_*; U_*) = 0;$$

solving adjoint equation:

$$\partial_W L(\varepsilon_*, U_*, \Lambda_*) = \partial_W E^\square(\varepsilon_*; U_*) + \Lambda_* \partial_W A(\varepsilon_*; U_*) = 0;$$

and solving state equation:

$$\partial_\Lambda L(\varepsilon_*, U_*, \Lambda_*) = A(\varepsilon_*; U_*) = 0.$$

In some embodiments of this method, the porosity $\varepsilon_n$ preferably ranges from 0.4, 0.45, 0.5, 0.55, 0.6, 0.65, 0.7, 0.75 to 0.8 and a parameter $\delta_n$ is selected which keeps porosity within this range.

In other embodiments of the present disclosure the dimensions of the GDL along an x-, y- and z-axis are suitable for incorporating the GDL into a hydrogen fuel cell. For example, a ratio of length to thickness $$\left(\frac{\ell}{h}\right)$$

of the GDL can range from about 10:1, 20:1, 30:1, 40:1, 50:1, 60:1, 70:1, 80:1, 90:1 to 100:1 or any intermediate ratio or value within this range. Preferably, the thickness will range from about 50:1, 60:1, to 70:1. The GDL is arranged in a fuel cell next to a flow of oxygen which in most embodiments is contained in a gas or liquid. The flow along the length of the GDL may be linear or curved or follow other paths between an input and outlet for the flow.

In other embodiments, the porosity along the length of the GDL is selected so as to maximize electrical output when the oxygen mass fraction decreases over the length of the GDL by about 5, 10, 20, 30, 40, 50, 60, 70, 80, 90 or >90% based on the mass fraction oxygen out ($c_{out}$) divided by the mass fraction of oxygen in ($c_{in}$). For example, the porosity along the length of the GDL can be selected so as to maximize electrical output when the oxygen mass fraction decreases over the length of the GDL by about 50, 55, 60, 65, to about 70% based on the mass fraction oxygen out ($c_{out}$) divided by the mass fraction of oxygen in ($c_{in}$).

Advantageously, this method for forming the GDL may rely on automatically calculating and solving the equations disclosed herein, for example, by using a computer program or by use of a computer or microprocessor, for example, using software containing the steps described by the program in FIG. 11.

Another embodiment of the invention is directed to a cathode gas diffusion layer (GDL) made by the method disclosed herein which has a porosity gradient along its length (x-axis) which typically has increasing porosity along the direction of oxygen flow along the x-axis or length of the GDL. The porosity gradient may span a range of porosity for example from a lower limit of about 0 to about 90% to an upper, greater limit of about >0 to 95% porosity along the length or x-axis of a GDL. For example, the porosity along a porosity gradient can range from about 20 to 80%, about 40 to 70%, or about 50 to 60% along the length or x-axis of the GDL, where porosity is a percentage of a surface or volume of the GDL containing pores. Porosity can range from 40% to 80%. An optimum graduating porosity GDL helps control the gas flow resulting in a uniform catalytic reaction between oxygen and hydrogen.

The GDL of the invention preferably has a quality of oxygen distribution ($Q_D$) that exceeds that of otherwise similar GDL having a fixed porosity. The $Q_D$ of a GDL of the invention may be 85, 86, 87, 88, 89, 90, 91, 92, 93, 94, 95, 96, 97, 98, 99 or >99%. Preferably, the $Q_D$ will be at least 95% for the GDL of the invention. A comparison between a GDL of the invention having a variable porosity or porosity gradient may be made to a control GDL having fixed porosity where the overall porosity of both GDLs is the same.

Another embodiment of the invention is directed to a hydrogen fuel cell or fuel cell assembly comprising a hydrogen fuel, an anode, electrolyte, cathode catalyst layer, the cathode GDL as disclosed herein with variable or customized porosity along its length, and, adjacent to the GDL, a channel which has an inlet and an outlet through which oxygen flows.

Yet another embodiment of the invention is directed to a method for producing electricity comprising operating the hydrogen fuel cell as disclosed herein by supplying it with a hydrogen fuel and a flow of oxygen. In some embodiments of this method the porosity of the cathode GDL and operating conditions are selected to minimize total variation of oxygen distribution on the catalyst layer. In other embodiments of this method the porosity of the cathode GDL and operating conditions are selected to maximize the amount of oxygen on the catalyst layer. In still other embodiments of this method, the porosity of the cathode GDL and operating conditions are selected to minimize local hot spots on the catalyst layer and/or minimize local accumulation of water on the catalyst layer compared to an otherwise similar method using a GDL having constant porosity. For example, it may reduce the number or intensity of local hotspots or accumulation of a wt % of water by at least 5, 10, 20, 30, 40, 50, 60, 70, 80, or 90% compared to a method using an otherwise similar GDL having the same overall porosity but a fixed porosity over the entire GDL. In some embodiments, this method will produce at least 5, 10, 20, 30, 40, 50, 60, 70, 80, 90% more electricity or provide a more even and reliable current than an otherwise similar method using a fuel cell containing a GDL having a fixed porosity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

FIGS. 11-1 to 11-8 in aggregate describe one example of a computer program usable in, or implementing, the method disclosed herein.

DETAILED DESCRIPTION OF THE INVENTION

Figure 1A:
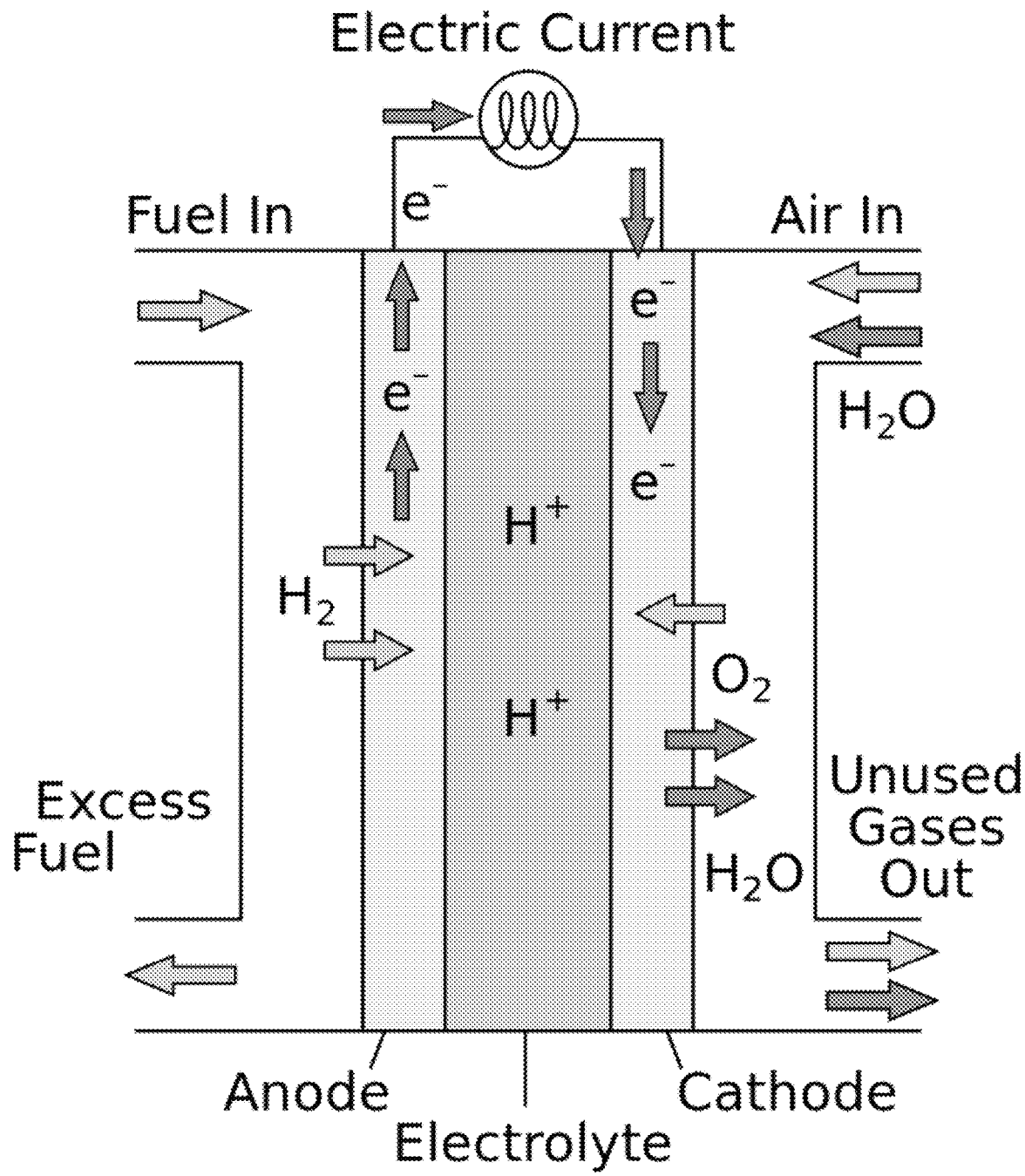
FIG. 1A. Hydrogen fuel cell schematic. The vertical axis shown by this figure corresponds to the length (x-axis) of the GDL disclosed herein. The catalyst layer and gas diffusion layer are subsumed into the cathode layer described by this figure.

As detailed herein, the invention is directed to a method for designing and making an efficient and stable gas diffusion layer for a fuel cell as well as the gas diffusion layer itself, a fuel cell containing the gas diffusion layer and to efficient methods for generating electricity using fuel cells containing the gas diffusion layer with a porosity gradient.

Fuel cells, such as hydrogen fuel cells and their components are known. Typically, a polymer electrolyte membrane ("PEM") fuel cell comprises a membrane electrode assembly ("MEA") which contains gas diffusion and catalyst layers.

The methods disclosed herein are applicable for any type of fuel cell and can (i) minimize the total variation of the reacting species (in one case oxygen and hydrogen over catalyst layer M) and (ii) maximize electrical or energy output.

The polymer electrolyte membrane ("PEM") or proton exchange membrane is a specially treated material similar in appearance to ordinary kitchen plastic wrap which conducts only positively charged ions and blocks electrons. The PEM is the key to the fuel cell technology; it preferably permits only the necessary ions to pass between the anode and cathode. Other substances passing through the electrolyte may otherwise disrupt the chemical reaction. For transportation applications, the membrane is very thin—in some cases under 50 microns, preferably under 40 microns, under 30 microns, under 20 micros or under 10 microns.

A layer of catalyst is added on both sides of the membrane—the anode layer on one side and the cathode layer on the other. Conventional catalyst layers include nanometer-sized particles of platinum dispersed on a high-surface-area carbon support. This supported platinum catalyst is mixed with an ion-conducting polymer (ionomer) and sandwiched between the membrane and the GDLs. On the anode side, the platinum catalyst enables hydrogen molecules to be split into protons and electrons. On the cathode side, the platinum catalyst enables oxygen reduction by reacting with the protons generated by the anode, producing water. The ionomer mixed into the catalyst layers allows the protons to travel through these layers.

The GDLs preferably sit outside the catalyst layers and facilitate transport of reactants into the catalyst layer, as well as removal of product water. Each GDL is typically composed of a sheet of carbon paper in which the carbon fibers are partially coated with polytetrafluoroethylene (PTFE). Gases diffuse rapidly through the pores in the GDL. These pores are kept open by the hydrophobic PTFE, which prevents excessive water buildup. In many cases, the inner surface of the GDL is coated with a thin layer of high-surface-area carbon mixed with PTFE, called the microporous layer. The microporous layer can help adjust the balance between water retention (needed to maintain membrane conductivity) and water release (needed to keep the pores open so hydrogen and oxygen can diffuse into the electrodes).

Components used to incorporate an MEA into a fuel cell can include gaskets, which provide a seal around the MEA to prevent leakage of gases, and bipolar plates, which are used to assemble individual PEM fuel cells into a fuel cell stack and provide channels for the gaseous fuel and air. Each individual MEA produces less than 1 V under typical operating conditions, but most applications require higher voltages. Therefore, multiple MEAs are usually connected in series by stacking them on top of each other to provide a usable output voltage. Each cell in the stack is sandwiched between two bipolar plates to separate it from neighboring cells. These plates, which may be made of metal, carbon, or composites, provide electrical conduction between cells, as well as providing physical strength to the stack. The surfaces of the plates typically contain a "flow field," which is a set of channels machined or stamped into the plate to allow gases to flow over the MEA. Additional channels inside each plate may be used to circulate a liquid coolant.

Each MEA in a fuel cell stack is sandwiched between two bipolar plates, but gaskets must be added around the edges of the MEA to make a gas-tight seal. These gaskets are usually made of a rubbery polymer. Advantageously, in some embodiments carbon fiber can be used for the GDL and platinum for the CL.

A basic schematic of a hydrogen fuel cell is shown by FIG. 1A. Fuel cell elements include an electrolyte substance, which usually defines the type of fuel cell, and can be made from a number of substances like potassium hydroxide, salt carbonates, and phosphoric acid; a fuel, a common fuel is hydrogen; an anode catalyst, usually fine platinum powder, which breaks down the fuel into electrons and ions; a cathode catalyst, often nickel, that converts ions into waste chemicals, with water being the most common type of waste, gas diffusion layers that are designed to resist oxidization. Other elements of fuel cells and types of fuel cells are described by hypertext transfer protocol secure: //_en.wikipedia.org/wiki/Fuel_cell which is incorporated by reference (last accessed Jun. 3, 2019).

The gas diffusion layer (GDL) is a core component of a fuel cell and is commonly composed of non-woven carbon fiber, e.g., carbon fiber paper, or woven carbon cloth. The main function of the GDL is to provide conductivity (e.g., gaseous flow conductivity and/or electrical conductivity), and help gases to come in contact with the catalyst. The GDL electrically connects the catalyst and current collector. It is porous, electrically conductive, and thin. The reactants must be able to reach the catalyst, but conductivity and porosity can act as opposing forces. Preferably, the GDL is composed of about one third Nafion-type or about 15% PTFE. The carbon particles preferably used in the GDL can be larger than those employed in the catalyst because surface area is not the most important variable in this layer. GDL should be around 10-50 μm thick, preferably 15-40 μm, 20-35 μm, 25-30 μm thick to balance needed porosity with mechanical strength. Often, an intermediate porous layer is added between the GDL and catalyst layer to ease the transitions between the large pores in the GDL and small porosity in the catalyst layer. Since a primary function of the GDL is to help remove water, a product, flooding can occur when water effectively blocks the GDL. This limits the reactants ability to access the catalyst and significantly decreases performance. Teflon can be coated onto the GDL to limit the possibility of flooding. Several microscopic characteristics in the GDLs such as porosity, tortuosity and permeability can be affected by the particle size. These variables have incidence over the behavior of the fuel cells.

Two major GDL substrates are carbon cloth and paper, The GDL can be made by weaving carbon fibers into a carbon cloth, such as GDL-CT or ELAT or by pressing carbon fibers together into a carbon paper such as Sigracet®, or those made by Freudenberg or Toray. Porosity of a GDL material can be varied by selection of a type of substrate or by selection of particular weaving methods. Many standard GDLs contain a microporous layer (MPL) and are treated with materials such as PTFE to make them more hydrophobic. The MPL typically provides a smooth layer with plenty of surface area for catalyst and good contact with the membrane. The MPL often uses PTFE as a binder that increases hydrophobicity and which helps keep the water within the membrane from escaping and drying out the membrane and causing higher resistance (lower performance). An additional PTFE coating(s) on the MPL surface may be applied to further augment this.

A GDL essentially acts as an electrode that facilitates diffusion of reactants across the catalyst layered membrane. The surface area and porosity of the GDL are what allow for the reactants in the channels of the bipolar plate to diffuse along the active area (catalyst area) of the membrane. With the increased surface area that the GDL provides, transportation of electricity from each individual catalyst site in the Membrane Electrode Assembly (MEA) to the current collectors increases. The GDL also helps remove by-produced water from the catalyst layer and prevents chamber flooding and can keep some water on the catalyst layer surface to improve conductivity throughout the membrane. A GDL also allows for heat transfer during fuel cell operation. Any method that results in producing a GDL having variable porosity can be used.

The invention is includes a method of making a GDL that permits reaction of oxygen and hydrogen gases in a cathode part of a hydrogen fuel cell. The GDL can be viewed as a two dimensional nonlinear, coupled system of Darcy, continuity, and convection-diffusion equations, incorporated with suitable boundary conditions to model or represent electrochemical reactions in a cathode catalyst.

The GDL is formed to provide (i) an oxygen-hydrogen reaction rate that is even (e.g., consistent) over the length of the catalyst layer thus avoiding undesired accumulation of heat and water and improving fuel cell stability; and (ii) a fuel cell catalyst layer that has a high electricity output for a fuel cell having a catalyst layer with variable porosity along the x-axis.

The GDL structure may be tailored with a porosity gradient such that when used as a GDL in a fuel cell it attains a uniform reaction rate over the GDL, reduces undesired accumulation of heat and water in portions of the GDL and efficiently produces electricity from hydrogen and oxygen.

Fuel cells are electrochemical devices that convert the chemical energy of reactants into electricity through chemical reactions. The invention as disclosed herein is based on hydrogen fuel cells in which the reactants are hydrogen gas as fuel and oxygen gas preferably present in the air as an oxidant.

The techniques disclosed herein are applicable for any kind of fuel cell as they control fluid by (i) minimizing total variation of the reacting species such as hydrogen and oxygen and (ii) by maximizing electrical or energy output.

One stack of a hydrogen fuel cell preferably contains three parts: a cathode, an anode and a membrane that separates the cathode and the anode. The cathode and anode both contain a flow channel, a gas diffusion layer, and a catalyst layer.

Figure 1B:
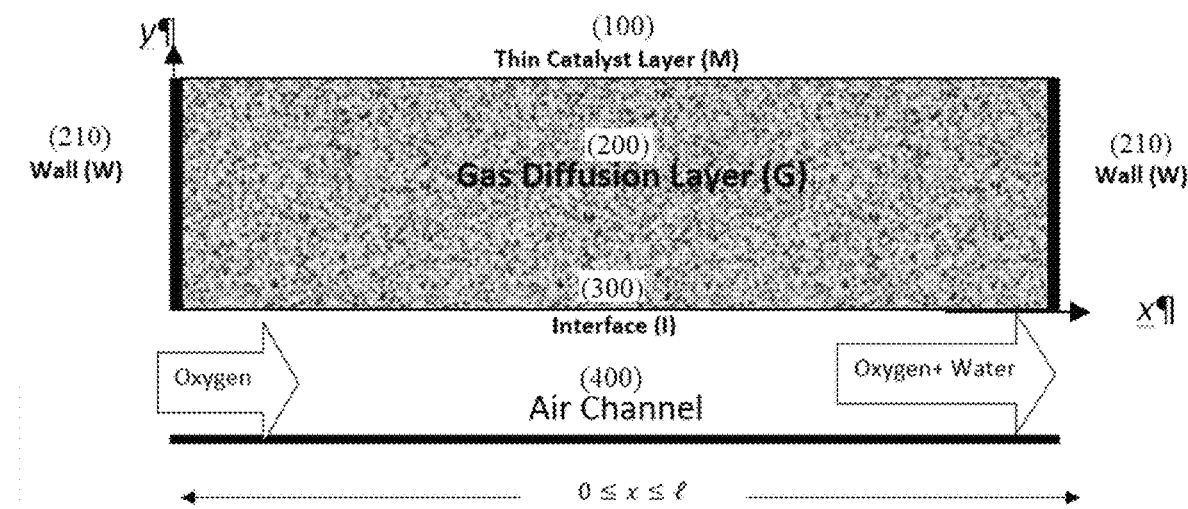
FIG. 1B. A 2-dimensional cross section for the cathode part of a hydrogen fuel cell showing GDL length ($\ell$) and thickness (h).

The invention focuses on the cathode part of a hydrogen fuel cell as shown in FIGS. 1A and 1B. FIG. 1A depicts a hydrogen fuel cell and FIG. 1B depicts a 2 dimensional cross section of the cathode part. This cathode part comprises three main parts: an air flow channel to provide oxygen for reaction (400); a gas diffusion layer (GDL) comprising a porous medium for diffusing oxygen and both water and electrons (200); and a catalyst layer (CL) (100) to catalyze an electrochemical reaction at the cathode that produces an electrical current. The CL boundary can be represented as an interface.

The hydrogen fuel cell works as follows. Oxygen gas (or air) is delivered in the cathode flow channel (400) while hydrogen gas is delivered in the anode flow channel. Both oxygen and hydrogen diffuse through the cathode/anode GDLs and reach their CLs. FIG. 1 shows oxygen/air channel (400), an interface (300) with the cathode GDL (200) and catalyst layer (100). When the hydrogen molecules hit the anode CL, they split into hydrogen protons and electrons. The membrane, which lies between the anode and cathode, serves to transport these protons from the anode to the cathode CL to react with the oxygen molecules in the cathode CL.

On the other hand, the electrons are passed to the cathode side via an external circuit, and through which the electrical current is utilized to supply electricity to an external device.

The following electrochemical reaction takes place at the cathode CL:

$$2H^+ + \frac{1}{2}O_2 + 2e^- \rightarrow H_2O + \text{Heat} \quad (1)$$

From reaction (1), the current density of electrons is proportional to the amount of oxygen entering the reaction. The output of this reaction is heat and water. However, both water and heat can reduce the lifetime of the cell if their distribution over the CL is uneven. When water accumulates in local regions of the gas diffusion layer or catalyst layer of the cathode it prevents the oxygen from entering the reaction. When the gas diffusion layer or catalyst layer is overheated in some regions, it hydrates and does not transport the protons needed for the reaction. Hence, the reaction becomes limited or inactive in case of accumulation of water or heat. Consequently, the capacity of the catalyst layer, which is often made of expensive platinum, is not entirely utilized.

The method as disclosed herein solves these problems of accumulation of heat in the membrane or water in the cathode CL by providing a GDL having a tailored porosity gradient that permits the oxidation of hydrogen to take place at equal rates over the CL, thus reducing local accumulations of water and heat. The method disclosed herein produces a GDL that uniformly distributes both water and heat over the CL (M, 100) thus making a fuel cell more stable and efficient.

The method of the invention provides an even oxygen-hydrogen reaction rate over the catalyst layer of a fuel cell, thus avoiding the local accumulation of heat and water. Preferably the reaction rate does not vary by more than 30%, preferably no more than 20%, no more than 10% or no more than 5% between the upstream end and downstream ends of the catalyst layer. This also increases the life and stability of the fuel cell, as well as its efficiency. The method provides a gas diffusion layer having a tailored porosity that maximizes the electrical output of a fuel cell. The structure described herein differs from the model described by Jamal H. Al-Smail, Optimal porosity design for gas diffusion layers of hydrogen fuel cells, *Proceedings of the Conference on Summer Computer Simulation, SummerSim* 2015, Chicago, IL, USA, Jul. 26-29, 2015. ACM 2015, ISBN 978-1-5108-1059-4 because it uses a superior porosity design and porosity gradient. Fuel cell performance of the GDL and fuel cell of the present disclosure are provided by incorporating boundary condition (6) disclosed herein, which involves a porosity factor which takes into account the impact of an air channel-GDL interface porosity. Moreover, cost function (7) also disclosed herein meets the objectives of distributing oxygen molecules evenly on the catalyst layer and maximizing usable oxygen molecules on the catalyst layer. One example of the method of determining and designing these characteristics is described by the Comsol Script code shown in FIG. 11. Test cases and data analysis from this are described in the examples below.

The fluid dynamics taking place in the gas diffusion layer (GDL) or domain (G) are modeled as described herein. This fluid dynamics consider a cross-section to be along the length (x-axis) of a GDL since it is the direction in which the gas pressure.

The z-axis is typically a non-critical variable because the drop in the oxygen mass fraction occurs mainly along the streamline or x-axis.

State variables are the gas mixture velocity $u_g = (u1, u2)$, gas mixture pressure $p_g$, gas mixture density $\rho_g$, and oxygen mass fraction $c_o$.

These variables are functions of the space variables $(x, y) \in G = [0, \ell] \times [0, h]$, where $\ell$ and $h$ are the length and thickness of the GDL, respectively. Thickness measures the distance between the outer surface of the GDL in contact with the flow of oxygen (interface 1 in FIG. 1B) and the inner catalyst layer.

All variables and parameters are defined in Table 1 and Table 2. Variables a and b are non-dimensional.

TABLE 1 variables and parameters used in the mathematical model

| Variable | Physical meaning |
|---|---|
| $c_o$ | Oxygen mass fraction[—] |
| $\varepsilon$ | The porosity of gas diffusion layer[—] |
| $K(\varepsilon)$ | The permeability of gas diffusion layer[m^2] |
| $\mu$ | Dynamic viscosity of gas mixture[m^2/s] |
| $\rho_g$ | Gas mixture density[Kg/m^3] |
| $u_g$ | Gas mixture velocity[m/s^2] |
| $p_g$ | Gas mixture pressure[Kpa] |

TABLE 2

Values of parameters used in the mathematical model

| Parameter | Values |
|---|---|
| $(c_{in}, c_{out})$ | (0.24, 0.1), inlet/outlet oxygen mass fraction |
| $D_o$ | $3.7 \times 10^{-5}$ [m ∧ 2/s], the diffusivity of oxygen |
| $K(\varepsilon)$ | $5.6 \times 10^{-4} \dfrac{\varepsilon^2}{1-\varepsilon^2}$ [m ∧ 2] |
| $(\ell, h)$ | $(0.2, 3 \times 10^{-3})$[m], length and thickness of GDL |
| $\mu$ | $2.07 \times 10^{-5}$ [Kg/(m · s)], dynamic viscosity of air |
| $(p_{in}, p_{out})$ | (1.02, 1.0) [Kpa], inlet/outlet pressure |
| $(r_o, r_g)$ | $(2, 9.3) \times 10^{-3}$ Kg/(m ∧ 2 · s)] |

This model assumes that the system is in a steady state, isothermal, and single-gas phase.

State equations in domain G, the gas diffusion layer: the gas velocity and pressure satisfy the Darcy and continuity equations, respectively:

$$\mu u_g + K(\varepsilon)\nabla p_g = 0, \quad (2)$$

$$\nabla \cdot (\rho_g u_g) = 0. \quad (3)$$

The Darcy equation (2) provides the gas conservation of momentum in a porous medium. Here, $K(\varepsilon)$ denotes the permeability of the GDL with a porosity $\varepsilon=\varepsilon(x)$, and $\mu$ is the gas dynamic viscosity.

$$K(\varepsilon) := 5.6 \times 10^{-4} \frac{\varepsilon^2}{1-\varepsilon^2}, \quad (4)$$

The continuity equation (3) provides the mass conservation of the gas mixture. The right-hand side of equation (3) is zero since the gas is nonreactive in the GDL.

The mass conservation of oxygen is given by the convection-diffusion equation:

$$\nabla \cdot \left(-\varepsilon D_o^{\text{eff}} \rho_g \nabla c_o + \varepsilon \rho_g c_o u_g\right) = 0, \quad (5)$$

where $D_o^{\text{eff}}(x):=\varepsilon^{1.5}(x) D_o$ denotes the effective diffusivity of oxygen at x, and $D_o$ is the oxygen diffusivity. The effective diffusivity is used to account for the porosity function $\varepsilon=\varepsilon(x)$, which is designed as described below.

The gas density $\rho_g$ is usually defined in terms of the state variables through the ideal gas law; however, to simplify the calculations since its impact is small it is taken to be constant.

Boundary conditions. On boundary (I), the Dirichlet conditions for both $p_g$ and $c_o$ are taken, for instance:

$$p_g = p_{in} + \frac{p_{out} - p_{in}}{\ell} x, \quad (6)$$

$$c_o = \varepsilon(x)\left(c_{in} + \frac{c_{out} - c_{in}}{\ell} x\right),$$

where $p_{in}$, $p_{out}$, $c_{in}$, $c_{out}$ are given parameters in Table 2. Boundary condition (6) provides a realistic model by making oxygen mass entering the GDL depend on GDL porosity. Unlike prior models, Boundary condition (6) as disclosed herein takes into account porosity graduation along the GDL which impacts fluid flow across this boundary.

On wall boundaries (W), wall conditions the normal fluxes of the gas mixture and oxygen are taken to equal to zero, where n denotes the outward unit vector to boundaries of G.

On boundary (M), reaction (1) is described by prescribing the normal fluxes of the gas mixture and that of oxygen:

$$(\rho_g u_g) \cdot n = -r_g c_o,$$

$$\left(-\varepsilon D_o^{\text{eff}} \rho_g \nabla c_o + \varepsilon \rho_g c_o u_g\right) \cdot n = r_o c_o,$$

$$(\rho_g u_g) \cdot n = \left(-\varepsilon D_o^{\text{eff}} \rho_g \nabla c_o + \varepsilon \rho_g c_o u_g\right) \cdot n = 0,$$

where the parameters $r_o$ and $r_g$ denote the consumption factors for the oxygen and gas mixture. The consumption rate of oxygen is $r_o c_o$, and the production rate of water is proportional to this rate.

The above system of state equations and boundary conditions has a unique structure and solution and is set to have a unique solution that simulates fluid flow.

Porosity is determined using the porosity function $\varepsilon=\varepsilon(x)$ of the GDL as shown below. The porosity function $\varepsilon$ is preferably a minimizer of the following cost functional E, $$E(\varepsilon; c_o) := \frac{1}{2} a \int_M \left(c_o - \frac{1}{|M|} \int_M c_o\right)^2 - b \int_M c_o^2, \quad (7)$$

where $c_o$ is obtained from the solution of the state equations and boundary conditions.

The first term of (7) minimizes the total variation of oxygen over the catalyst layer (M). Hence, this results permits Reaction (1) to take place uniformly over the CL, as the reaction rate (oxygen consumption) is proportional to the oxygen mass fraction, $r_o c_o$.

The second term of the (7) (with the minus sign) maximizes the total amount of oxygen over the CL so that the current density or electrical production is maximized.

Assuming $U=(u_g, p_g, c_o)$ denote the state variables defined in G, that is $U=U(x, y)$. Then, the system of the state equations together boundary conditions is schematically written as the following problem. For a given $\varepsilon$, find U satisfying $A(\varepsilon; U)=0$.

Find a smooth function $\varepsilon_* = \varepsilon_*(x)$ such that $$E(\varepsilon_*; U_*) = \min E(\varepsilon; U),$$

Subject to: $A(\varepsilon; U)=0$.

The solution $(E_*, U_*)$ is a minimizer of the Lagrangian L defined as $$L(\varepsilon, W, \Lambda) := E(\varepsilon; W) + \Lambda A(\varepsilon; W)$$

A local minimizer $(\varepsilon_*, U_*, \Lambda_*)$ of the Lagrangian must satisfy the necessary condition:

$$\nabla L(\varepsilon_*, U_*, \Lambda_*) = 0$$

involves solving three problems:

Constraint equation:

$$\partial_\varepsilon L(\varepsilon_*, U_*, \Lambda_*) = \partial_\varepsilon E(\varepsilon_*; U_*) + \Lambda_* \partial_\varepsilon A(\varepsilon_*; U_*) = 0$$

Adjoint equation:

$$\partial_W L(\varepsilon_*, U_*, \Lambda_*) = \partial_W E(\varepsilon_*; U_*) + \Lambda_* \partial_W A(\varepsilon_*; U_*) = 0$$

State equation:

$$\partial_\Lambda L(\varepsilon_*, U_*, \Lambda_*) = A(\varepsilon_*; U_*) = 0$$

The numerical methods are briefly sketched out in the following steps. Ordinarily a computer program is used to execute these steps, such as that described by FIG. 11 or another computer program written to recognize the same parameter and variables and execute the same steps.

1. Start with $\varepsilon_n$ n in the admissible range [0.4,0.8] (i.e., a porosity ranging from 40 to 80%)
2. Solve the state equation for $U_n$: $A(\varepsilon_n, U_n)=0$
3. Solve the adjoint equation for $\Lambda_n$: $\Lambda_n \partial_W A(\varepsilon_n, U_n)=-\partial_W E(\varepsilon_n, U_n)$
4. Solve the constraint equation for $\partial_{249} E(\varepsilon_n, U_n)$: $\partial_\varepsilon E(\varepsilon_n, U_n)=-\Lambda_n \partial_\varepsilon A(\varepsilon_n, U_n)$
5. Update $\varepsilon_n$: $\varepsilon_{n+1}=\varepsilon_n-\delta_n\partial_\varepsilon E(\varepsilon_n, U_n)$; where the parameter $\delta_n$ is chosen in every iteration such that it keeps $\varepsilon_{n+1}$ within the admissible range of porosity.

The state and adjoint equations in steps 2 and 3 are written in standard weak formulations. A finite element method is then implemented to discretize the solution, and Newton's method is used to solve the nonlinear systems of state and adjoint.

The optimal tailored-porosity design is obtained by iterating the above algorithm by using the Gradient-Descent method. The stopping criterium is when $|\varepsilon_{n+1}(x)-\varepsilon_n(x)|$ becomes sufficiently small.

The numerical results of the above optimization problem (7) are presented below. The numerical results are preferably obtained using a Comsol script code, such as that shown by FIG. 11. Briefly, the numerical results show the importance of providing a tailored-porosity for the GDL that optimizes fuel cell performance. This is attained by first solving the state equations by taking constant porosities of a GDL, that is, without providing tailored porosity.

These numerical results also show the solution to the optimization problem (7) for different cases:
a. only minimizing the total variation of oxygen on the CL,
b. a partial mix between minimizing the total variation of oxygen and maximizing the total amount of oxygen on the CL, and
c. a partial minimization of the total variation of oxygen on the CL and a dominant maximization of the total amount of oxygen in the CL.

When a GDL has a constant porosity, there is a variation of oxygen in the CL, which leads to non-uniform reaction rates and consequently accumulation of heat and water as shown. These problems become much serious when the aspect ratio of the GDL's dimensions $$\frac{\ell}{h}$$

is large. Here the ratio is $$\frac{\ell}{h} = 60.6,$$

which is large enough. The larger the ratio is, the greater depletion of oxygen along the air flow channel due to the pressure drop between the inlet and the outlet of the air channel as illustrated by FIGS. 2-4.

Figure 2:
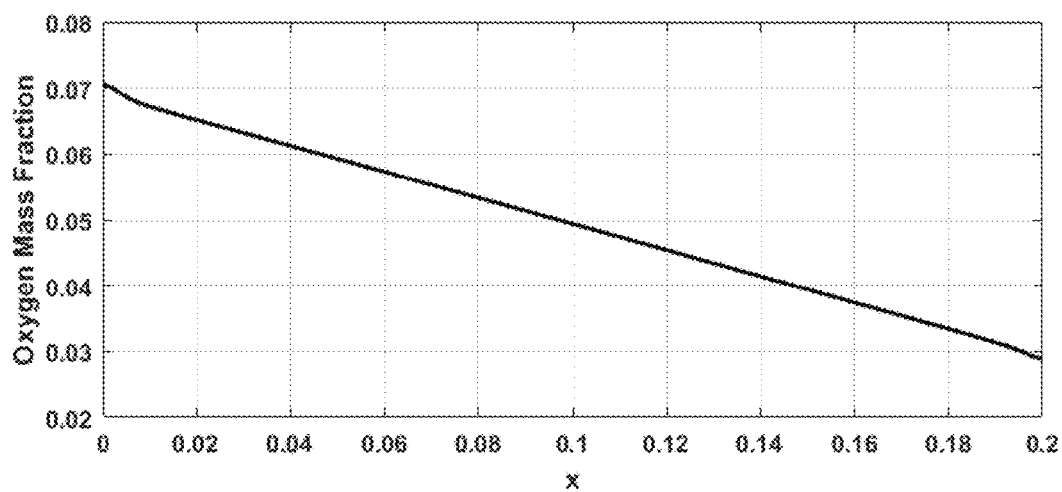
FIG. 2. Oxygen Mass Fraction with a GDL design of a constant porosity of 0.5.

FIG. 2 shows the oxygen mass fraction on the CL for the case when the GDL's porosity $\varepsilon(x)=0.5$, constant. The oxygen depletion is observable; it decreases from 0.07 to around 0.028, which a decrease of 60%.

Figure 3:
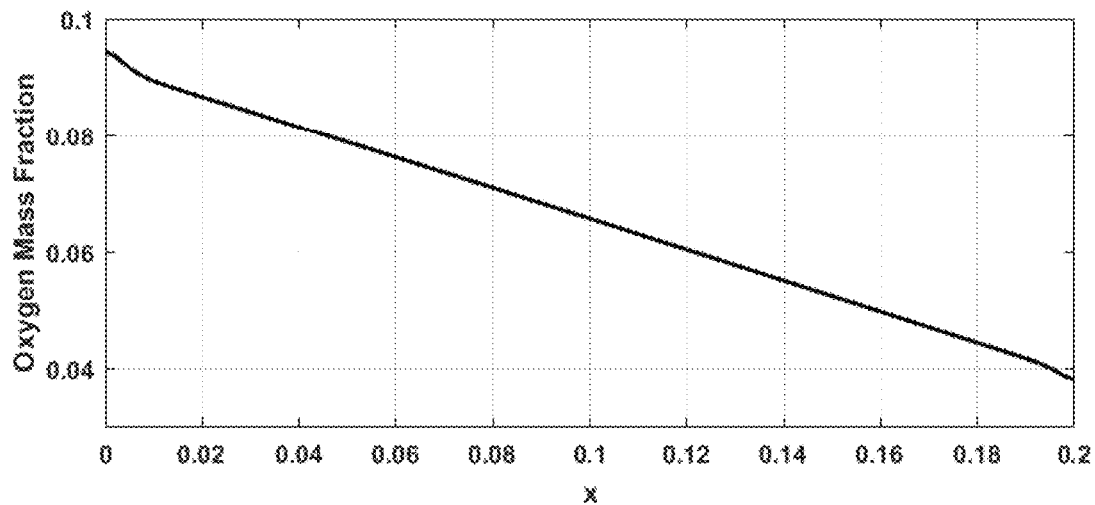
FIG. 3. Oxygen Mass Fraction with a GDL design of a constant porosity of 0.6.

FIG. 3 shows the oxygen mass fraction on the Cl for the case when $\varepsilon(x)=0.6$, constant. The oxygen mass fraction decreases from 0.095 to 0.038, which is also around 60%.

Figure 4:
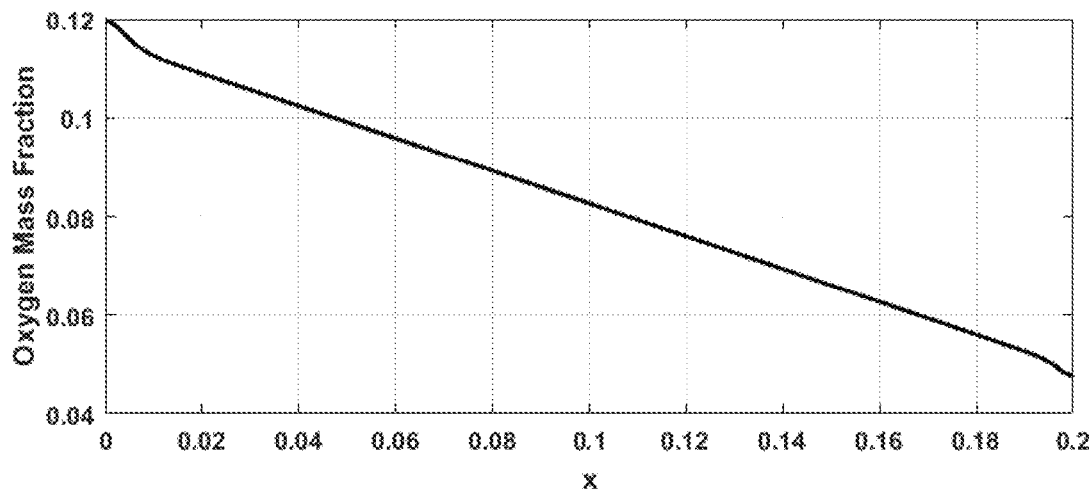
FIG. 4. Oxygen Mass Fraction with a GDL design of a constant porosity of 0.7.

FIG. 4 shows the case for $\varepsilon(x)=0.7$, constant. The oxygen mass fraction decreases from 0.12 to around 0.048, which is again around a 60% decrease.

These cases show that a constant porosity design for a GDL cannot resolve the issue of the oxygen variation on the CL. The higher the porosity is, the higher the mass fraction will be, yet the problem of the oxygen variation is present.

In contrast, the invention provides a way to effectively tailor the porosity of a GDL and resolve the issues of non-uniform reaction rates on the CL while maximizing oxygen mass fraction. The present disclosure includes a method that includes using equation (7) to reveal the best tailored-porosity design for a GDL. The three cases described by Examples 1-3 below exemplify this process. The iterations, which are shown in grayscales, of the optimization process start with an initial constant porosity $\varepsilon(x)=0.5$. The interations stop when converging to the tailored-porosity design (dashed).

EXAMPLES

Figure 5:
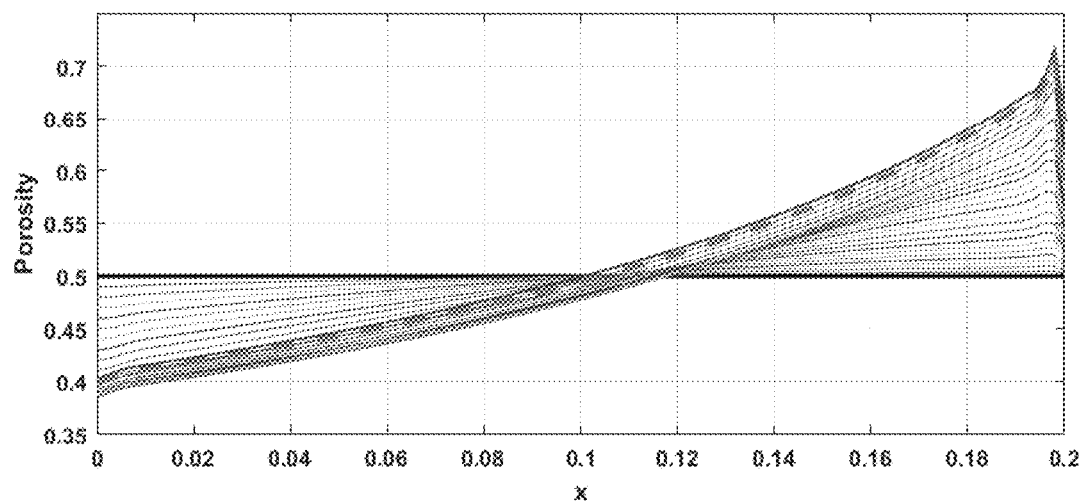
FIG. 5. Optimal Porosity Design for Case 1 (dashed line).
Figure 6:
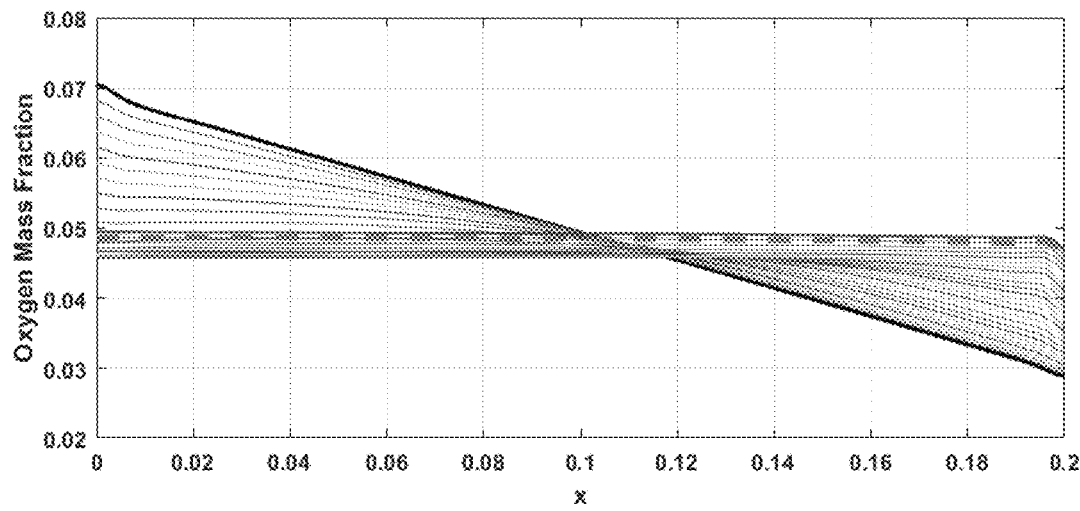
FIG. 6. Optimal Oxygen Distribution for Case 1 (dashed line).

Example 1. Case I: Only minimizing the total variation of oxygen on the CL. FIG. 5 shows each porosity design corresponding to the resulting oxygen mass fractions shown in FIG. 6. As noted earlier, with the constant $\varepsilon(x)=0.5$, the oxygen mass fraction decreases from 0.07 to 0.028, which is a 60% decrease as also apparent from FIG. 6.

A tailored-porosity design for this case is given the dashed curve in FIG. 5. The porosity gradually increases from 0.4 to around 0.7. With this advantageous design, the oxygen mass fraction at the CL is flat as shown in by the dashed line in FIG. 6 and the even distribution of oxygen mass fraction is equal to its average before adjustment. However, since this design leads to a flat oxygen distribution, all reaction rates, water, and heat are uniformly distributed over the GDL.

Example 2. Case 2: Considering both the total variation of oxygen and the total amount of oxygen on the CL. In this case, the objective was to minimize variation of oxygen is minimized and the amount of oxygen maximized over the CL to provide an even and uniform distribution of oxygen.

Figure 7:
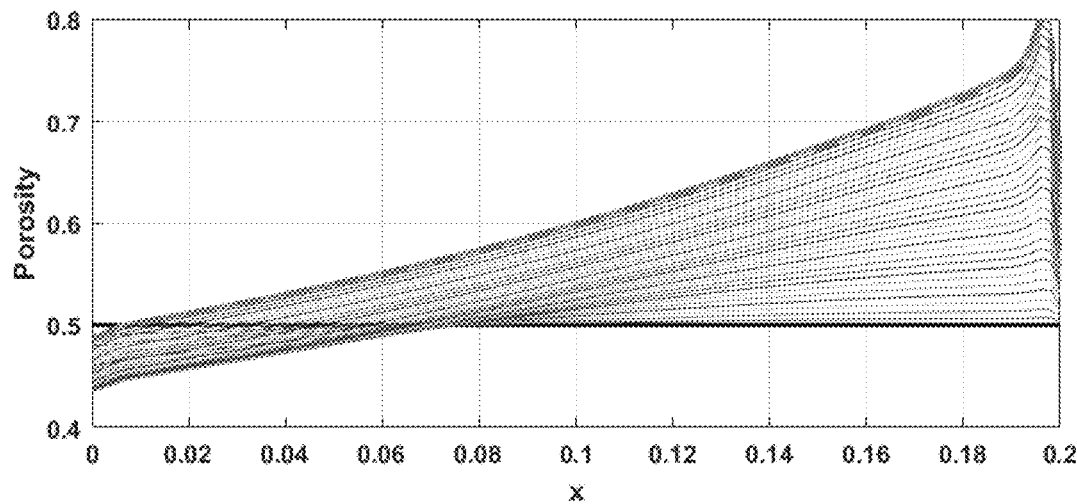
FIG. 7. Optimal Porosity Design for Case 2 (dashed line).

FIG. 7 shows the best tailored-porosity curve (dashed) for this case; the porosity values ranged from around 0.48 to the max 0.8, as set as the threshold.

Figure 8:
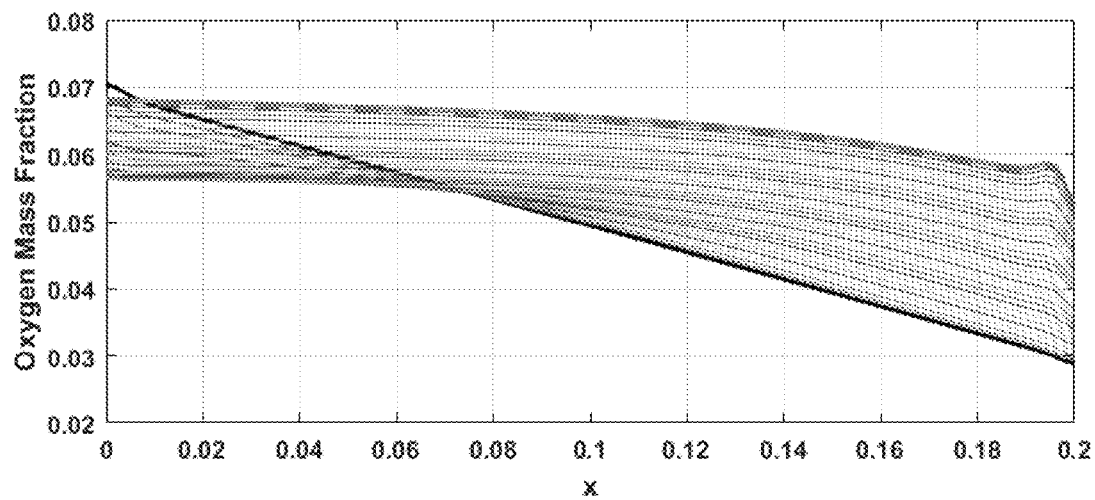
FIG. 8. Optimal Oxygen Distribution for Case 2 (dashed line).

FIG. 8 shows the oxygen distribution (dashed) resulting from the design of the GDL. The best oxygen distribution was still relatively flat compared to the initial one corresponding to that of a constant porosity.

Moreover, the amount of oxygen has increased due to involving the maximizing term (the second term) of equation (7). This case shows that a select tailored-porosity design serves to provide both a uniform oxygen distribution while maintaining as much of it as possible.

Example 3. Case 3: Considering minimizing the total variation of oxygen but mainly maximizing the amount of oxygen on the CL. In this case, the total amount of oxygen is maximized in favor of its uniform distribution.

Figure 9:
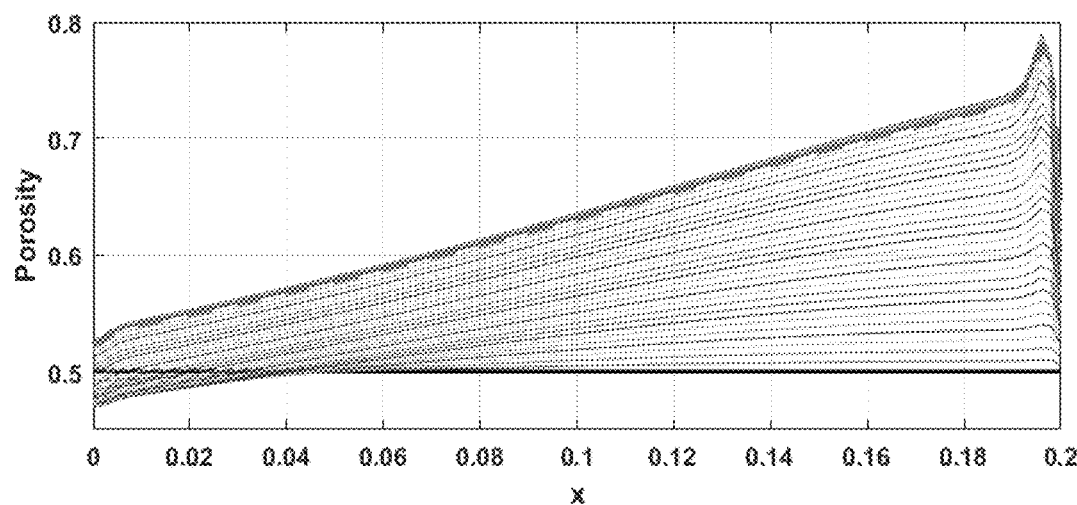
FIG. 9. Optimal Porosity Design for Case 3 (dashed line).
Figure 10:
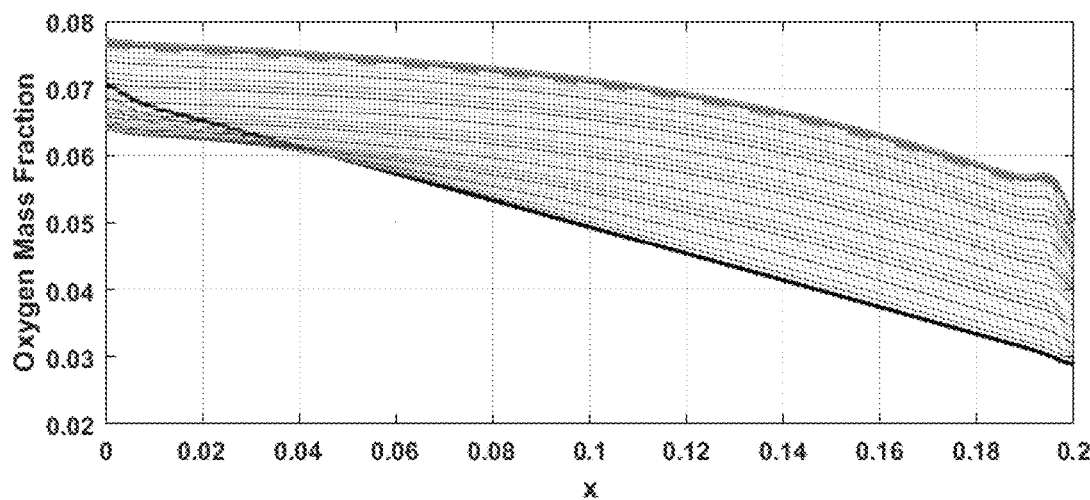
FIG. 10. Optimal Oxygen Distribution for Case 3 (dashed line).

FIG. 9 shows the tailored-porosity design (dashed) for a GDL. With this advantageous design, the oxygen distribution (dashed) as shown in FIG. 10, gets higher and is given more attention than its uniform distribution. Nonetheless, the best oxygen distribution has less variation than the one with from a GDL having a constant porosity design.

Measurement of oxygen on the catalyst layer ("CL"). A measurement of the quality of oxygen distribution on the CL is defined by:

$$c_{ave} = \frac{1}{M}\int_M c_o dx \text{ and } c_{var} = \frac{1}{M}\sqrt{\int_M (c_o - c_{ave})^2 dx},$$

where $c_{ave}$ is the oxygen average on the CL, and $c_{var}$ is the average of the total variation of oxygen on the CL.

The quality of oxygen distribution, denoted as $Q_D$, on the CL is defined as follows:

$$Q_D = \left(1 - \frac{c_{var}}{c_{ave}}\right) * 100\%$$

Constant porosity designs. For the cases of constant porosity designs, the table below shows that as the porosity increases, the oxygen average increases, but the 0%. does not change and remains at 79.6%; see FIGS. 2-4.

| Constant porosity, $\varepsilon(x)$ | $C_{ave}$ | $Q_D$ |
| --- | --- | --- |
| 0.5 | 4.94E−02 | 79.6 |
| 0.6 | 6.57E−02 | 79.6 |
| 0.7 | 8.26E−02 | 79.6 |

The table below gives the oxygen average and the quality of oxygen distribution for the three cases involving tailored porosity: Case 1, Case 2, and Case 3; see also FIGS. 5-10. The data below show that all cases had a remarkable spatial improvement in the quality of oxygen distribution—compare to the $Q_D$ of 79.6% for the constant porosity designs above.

| Tailored porosity | $C_{ave}$ | $Q_D$ |
| --- | --- | --- |
| Case 1 | 4.84E−02 | 99.5 |
| Case 2 | 6.41E−02 | 95.8 |
| Case 3 | 6.88E−02 | 92.0 |

The results shown above show that when a GDL has a high geometry aspect ratio, the oxygen distribution cannot be uniform due to pressure drop along the length (x-axis) of the GDL of a hydrogen fuel cell. Based on this finding, innovative non-uniform porosity designs for a GDL are described which permit (i) the oxygen distribution over the cathode catalyst layer to be uniform leading to a stable fuel cell so that electrochemical reaction (1) takes place uniformly over the catalyst layer; prevent accumulation of water on the GDL which can block catalytic sites and reduce fuel cell efficiency, and prevent heat accumulation which keeps the membrane hydrated and maintains its ability to transport proteins, which also increases fuel cell efficiency.

Furthermore, the designs keep the amount of oxygen at a maximum so that the reaction rate (which is proportional to the oxygen flux or current density) increases to maximize the electricity production of the cell. The methods for producing a GDL disclosed herein are flexible can be adjusted when considering different fuel cell fuel sources, such as gases like natural gas, propane and butane. GDLs suitable for fuel cells oxidizing these other fuel sources can benefit from the methods disclosed herein.

Example 4. One example of a computer program to carry out calculation for the method of the invention is shown by FIG. 11. This program may be run or implemented using COMSOL Multiphysics, such as COMSOL Multiphysics® 5.4, available via hypertext transfer protocol (http:/) at www.comsol.com (last accessed Apr. 29, 2019, incorporated by reference).

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A fuel cell assembly with carbon diffusion layer, comprising:
    a catalyst layer ("CL"),
    a cathode gas diffusion layer ("GDL"), and
    an anode gas diffusion layer ("ADL")
    a cathode channel which has an inlet and outlet through which oxygen can flow;
    an anode channel which has an inlet and outlet through which fuel can flow;
    wherein the CL is between the ADL and the GDL, the anode channel is adjacent the ADL and the cathode channel is adjacent the GDL;
    wherein the GDL is a non-woven carbon fiber;
    wherein the GDL has a length (x-axis; l), thickness (y-axis; h) and width (z-axis; w) and is adjacent the channel in the fuel cell, wherein a porosity of the GDL increases along the length of the GDL, wherein the length of the GDL is measured from an end of the GDL nearest the inlet, and wherein a porosity is defined as an amount of unit surface area of the GDL occupied by pores, wherein the GDL has a porosity gradient to permit flow of oxygen through the GDL such that an oxygen mass fraction along the length or x-axis of the GDL meets boundary condition (6):

$$p_g = p_{in} + \frac{p_{out} - p_{in}}{\ell}x, \quad c_o = \varepsilon(x)\left(c_{in} + \frac{c_{out} - c_{in}}{\ell}x\right), \quad (6)$$

where $p_g$ is gas density, $p_{in}$ is inlet pressure, $p_{out}$ is outlet pressure, and x is a space variable;

where $c_o$ is the oxygen mass fraction, wherein $\varepsilon$ is the porosity of the GDL, x is a space variable, $c_{in}$ is inlet oxygen mass fraction, and $c_{out}$ is outlet oxygen mass fraction;

the porosity of the GDL along the length $\varepsilon = \varepsilon(x)$ is obtained by minimizing cost functional E:

$$E(\varepsilon; c_o) := \frac{1}{2}a \int_M \left(c_o - \frac{1}{|M|}\int_M c_o\right)^2 - b\int_M c_o^2, \quad (7)$$

wherein $c_o$ is obtained from solution of boundary condition (6), and a and b are scalar and M is the catalyst layer;

wherein the GDL meets the condition:

$$E(\varepsilon_*; U_*) = \min E(\varepsilon; U),$$

subject to $$A(\varepsilon; U) = 0;$$

wherein the solution is a minimizer of Lagrangian L, defined as $(\varepsilon, W, \Lambda) := E(\varepsilon; W) + \Lambda A(\varepsilon; W);$ and wherein $\varepsilon_n$ is represented by $\varepsilon_{n+1} = \varepsilon_n - \delta_n \partial_\varepsilon E(\varepsilon_n, U_n)$,
wherein a local minimizer $(\varepsilon_*, U_*, \Lambda_*)$ of the Lagrangian L that satisfies $$\nabla L(\varepsilon_*, U_*, \Lambda_*) = 0;$$

meets the conditions:

$$\partial_\varepsilon L(\varepsilon_*, U_*, \Lambda_*) = \partial_\varepsilon E(\varepsilon_*; U_*) + \Lambda_* \partial_\varepsilon A(\varepsilon_*; U_*) = 0;$$

$$\partial_W L(\varepsilon_*, U_*, \Lambda_*) = \partial_W E(\varepsilon_*; U_*) + \Lambda_* \partial_W A(\varepsilon_*; U_*) = 0; \text{ and}$$

$$\partial_\Lambda L(\varepsilon_*, U_*, \Lambda_*) = A(\varepsilon_*; U_*) = 0,$$

wherein the porosity $\varepsilon_n$ is in a range of from 0.4 to 0.8 and parameter $\delta_n$ is selected to keep porosity within this range, wherein a ratio of width to thickness $$\left(\frac{w}{h}\right)$$

of the GDL is in a range of from 10:1 to 100:1, and wherein a ratio of length to thickness $$\left(\frac{\ell}{h}\right)$$

of the GDL is in a range of from 50:1 to 70:1.

2. The fuel cell assembly of claim 1, wherein the oxygen mass fraction decreases over the length of the GDL by about 10 to about 90% based on the mass fraction oxygen out ($c_{out}$) divided by the mass fraction of oxygen in ($c_{in}$).

3. The fuel cell assembly of claim 1, wherein the porosity along the length of the GDL provides an electrical output when the oxygen mass fraction decreases over the length of the GDL by about 50 to about 70% based on the mass fraction oxygen out ($c_{out}$) divided by the mass fraction of oxygen in ($c_{in}$).

4. The fuel cell assembly of claim 1, wherein the porosity of the cathode gas diffusion layer increases from 40 to about 70%.

5. The fuel cell assembly of claim 1, wherein the cathode gas diffusion layer has a quality of oxygen distribution ($Q_D$) of at least 90%.

6. The fuel cell assembly of claim 1, wherein the cathode gas diffusion layer has a quality of oxygen distribution ($Q_D$) of at least 95%.

* * * * *